(12) United States Patent  (10) Patent No.: US 7,466,730 B2
Sekita et al. (45) Date of Patent: Dec. 16, 2008

(54) FEMTOSECOND LASER DEVICE HAVING OUTPUT STABILIZING MECHANISM

(75) Inventors: Hitoshi Sekita, Tokyo (JP); Kazuya Takasago, Tokyo (JP); Nobuo Nakata, Tokyo (JP); Arata Nakamura, Tokyo (JP)

(73) Assignee: Cyber Laser Inc., Tokyo (JP)

( * ) Notice: Subject to any disclaimer, the term of this patent is extended or adjusted under 35 U.S.C. 154(b) by 149 days.

(21) Appl. No.: 11/407,712

(22) Filed: Apr. 20, 2006

(65) Prior Publication Data
US 2006/0274795 A1  Dec. 7, 2006

(30) Foreign Application Priority Data
Apr. 21, 2005  (JP)  ............................. 2005-123825

(51) Int. Cl.
*H01S 3/13* (2006.01)
(52) U.S. Cl. ................................. 372/29.02; 372/29.01
(58) Field of Classification Search .................. 372/18, 372/29.012, 29.021, 29.02, 70, 29.01, 29.011, 372/29.014, 38.01

See application file for complete search history.

(56) References Cited

U.S. PATENT DOCUMENTS

2002/0171917 A1* 11/2002 Lelic et al. ................ 359/341.4
2005/0111500 A1* 5/2005 Harter et al. ................... 372/25

* cited by examiner

*Primary Examiner*—Armando Rodriguez
(74) *Attorney, Agent, or Firm*—Pearne & Gordon LLP

(57) ABSTRACT

A femtosecond laser with stabilized output, and a method for stabilizing the output of a femtosecond laser. The femtosecond laser comprises a regenerative amplifier, a photodetector, a control portion and a variable attenuator, wherein the variable attenuator is provided so as to be capable of controlling an output beam of the regenerative amplifier, the photodetector is provided between the regenerative amplifier and the variable attenuator, the photodetector detects an output beam of the regenerative amplifier and transmits the results of the detection to a power controller, and the power controller controls the variable attenuator depending on the a difference between a predetermined target value and the results.

13 Claims, 13 Drawing Sheets

FEMTOSECOND LASER DEVICE HAVING OUTPUT STABILIZING MECHANISM

BACKGROUND OF THE INVENTION (1) Field of the Invention

The present invention relates to a femtosecond laser device with stabilized output, in particular to a device and method relating to output stabilization by a regenerative amplifier.

(2) Description of the Related Art

Femtosecond lasers, so-called because they issue laser beams with pulse widths of femtosecond order, have a small pulse width and a very high energy density. For this reason, they are often used for machining applications, due to advantages such as having no thermal effects in the periphery of the portion being machined and the lack of debris due to its vaporization.

Therefore, femtosecond lasers have often been used in machining devices in recent years, and equipment has become available for this purpose.

However, prolonged use causes parameters of the laser device such as LD current, Pockels cell voltage and optical axis of the seed beam to deviate from their optimal values, so that the target output can no longer be obtained.

Since the gain of regenerative amplifiers was not able to be changed in conventional femtosecond lasers, the output depended on the pump beam. Additionally, the output level of the pump beam varies due to temporal changes. Hence, the drive current of the pump laser must be frequently adjusted to maintain the output of a femtosecond laser at its original level. Furthermore, changes in the properties of the optical materials used in regenerative amplifiers such as damage, temporal changes and temperature changes can make it impossible to maintain the output level of regenerative amplifiers simply by raising the output of the pump laser. Additionally, if an attempt is made to compensate for a large decrease in the gain of a regenerative amplifier by raising the output of the pump laser, this can overload the regenerative amplifier and cause damage. Additionally, this causes deterioration to advance more quickly.

BRIEF SUMMARY OF THE INVENTION

In order to resolve the above-mentioned problems, the present invention offers a femtosecond laser device with stabilized output comprising a regenerative amplifier, a photodetector, a control portion and a variable attenuator, wherein the variable attenuator is provided so as to be capable of controlling an output beam of the regenerative amplifier, the photodetector is provided between the regenerative amplifier and the variable attenuator, the photodetector detects an output beam of the regenerative amplifier and transmits the results of the detection to a power controller, and the power controller controls the variable attenuator depending on the a difference between a predetermined target value and the results. As a result, the output beam from the regenerative amplifier can be controlled by feed-forward control. Alternatively, a method and device are offered wherein the photodetector is provided behind the regenerative amplifier, to perform so-called feed-back control.

Additionally, the invention offers a femtosecond laser device with stabilized output comprising a regenerative amplifier, a first photodetector, a second photodetector, a power controller and a timing controller, wherein light reflected by a mirror for extracting a portion of the beam outputted from a laser cavity in the regenerative amplifier is incident on the first photodetector and the second photodetector, the first photodetector detects the intensity of an output beam from the laser cavity and transmits the results of the detection to the power controller, the second photodetector detects the waveform of the output beam from the laser cavity and transmits the results of the detection to the timing controller, and the timing controller sets a cutout timing of a laser pulse from the results of detection by the first and second photodetectors so as to output the maximum laser pulse from a cavity in the regenerative amplifier.

The invention offers a method for setting the cutout timing, comprising the following steps:

(1) capturing a waveform, sequentially obtaining a first, second and third peak, the peak before the second peak being the first peak and the peak following the second peak being the third peak;
(2) delaying the cutout timing if the sizes of the peaks are such that (first peak)>(third peak);
(3) advancing the cutout timing if the sizes of the peaks are such that (first peak)<(third peak); and
(4) if neither (2) or (3) apply, storing the second peak in memory and recording the timing.

The invention may further involve the following steps:

(5) repeating steps (1)-(4) after shifting the cutout timing forward by a plurality of pulses from the initial value.
(6) repeating steps (1)-(4) after shifting the cutout timing backward by a plurality of pulses from the initial value.

The outputs of these devices can be further stabilized by stabilizing the LD current. By embodying the above method in the form of a device, a femtosecond laser device with stabilized output can be achieved.

With the present invention, it is possible to stabilize the output of a regenerative amplifier which was difficult to achieve conventionally. Additionally, the duration over which the output is stable can be prolonged by compensating the outputs of the pump laser and the regenerative amplifier with respect to each other.

BRIEF DESCRIPTION OF THE DRAWINGS

FIGS. 5(a) and (b) are diagrams showing pulse waveforms.

DETAILED DESCRIPTION OF THE INVENTION

In the output stabilization of the femtosecond laser according to the present invention, the output is stabilized by feed-forward control in the regenerative amplifier and by optimizing the timing by which the femtosecond laser beam is injected and cut out. Additionally, the present invention proposes a method of stabilizing the output by optimizing the parameters relating to the optical axis and intensity of the pump laser.

Figure 11:
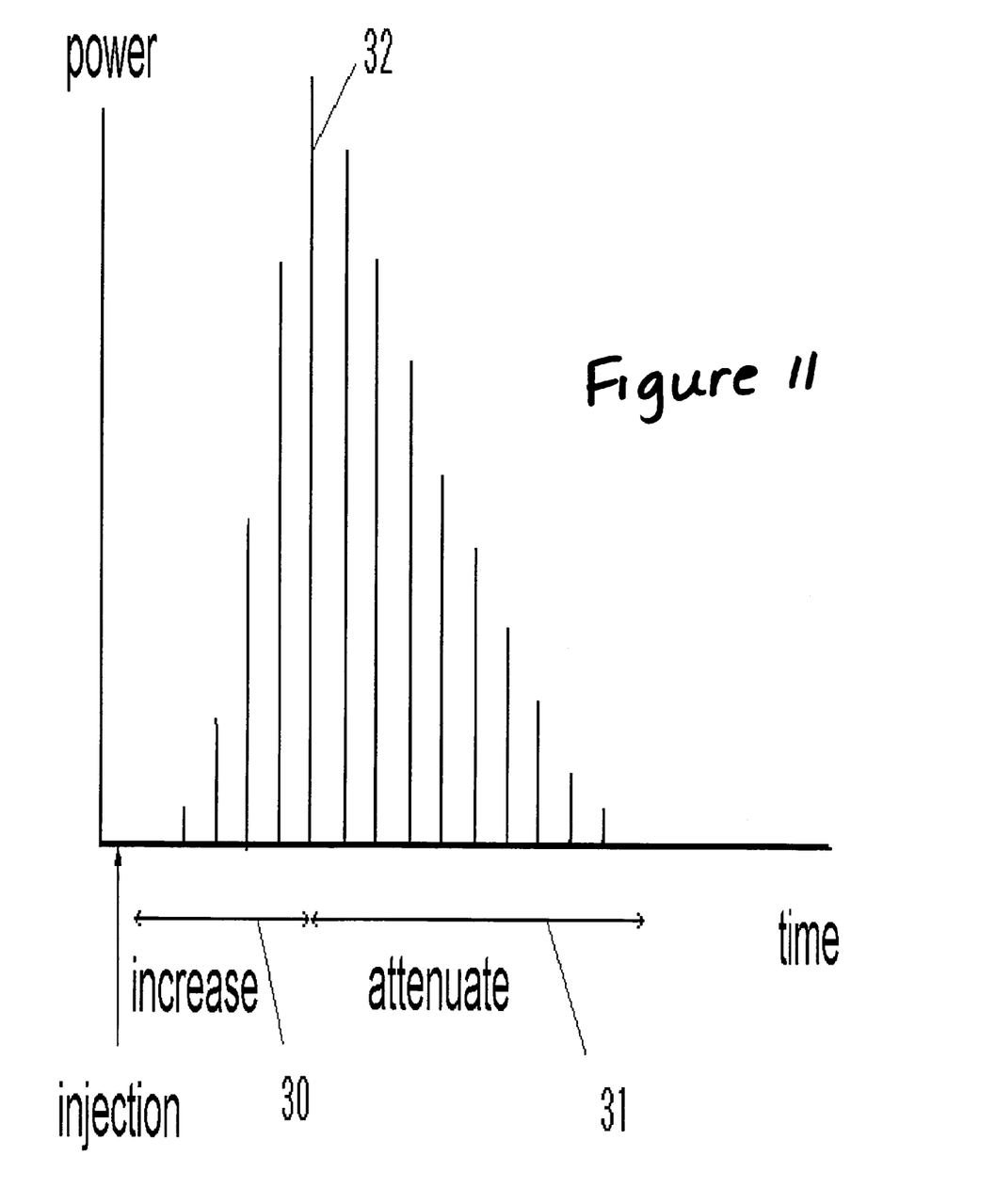
FIG. 11 is a graph showing the temporal change in the power of a pulse.
Figure 12:
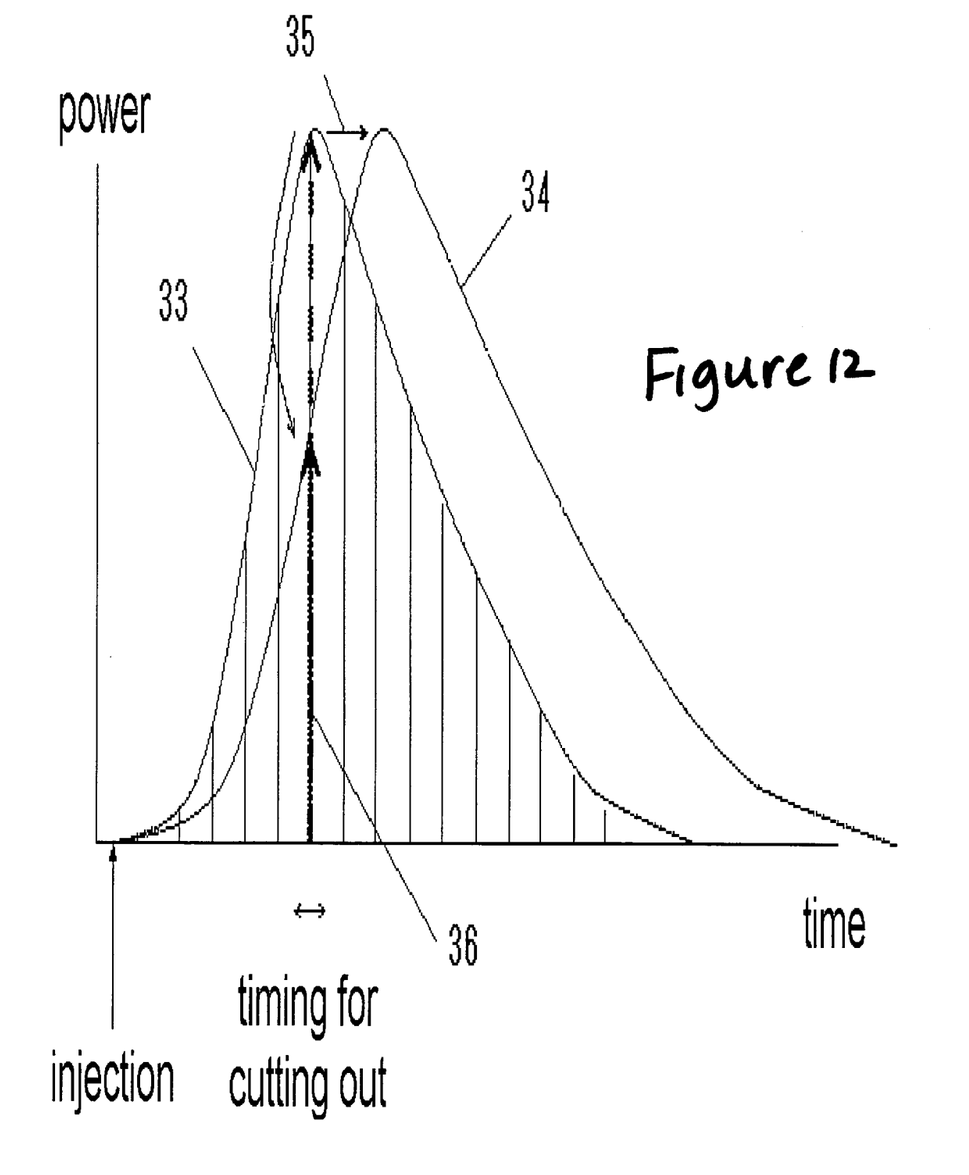
FIG. 12 is a graph showing how the temporal change in the power of a pulse changes with the passage of time.

First, the temporal change of energy in a regenerative amplifier shall be explained. FIG. 11 is a graph indicating the temporal change in pulse power. After the seed laser beam is injected, in the region denoted by reference number 30 in the drawing, the power increases as the pulse passes back and forth inside the cavity, and after the power peaks, the power attenuates due to losses in the cavity as seen in the region denoted by reference number 31. Accordingly, a pulse 32 of maximum power can be extracted by cutting out a pulse at the time the power inside the cavity is at its peak. However, as shown in FIG. 11, when considering the envelope 33, 34 of the temporal change of the pulses, the pulse power will change over time so that the peak power can shift as indicated by the reference number 35. As a result, if the extraction timing is set so as to cut out the peak power in the original device, the deviation of the peak over time can cause pulses 36 that are not at the maximum power to be extracted, thus resulting in a lower output. Therefore, a pulse of maximum power can be extracted by shifting the extraction (hereinafter referred to pulse cutout) timing by the amount of the peak shift 35.

Figure 1:
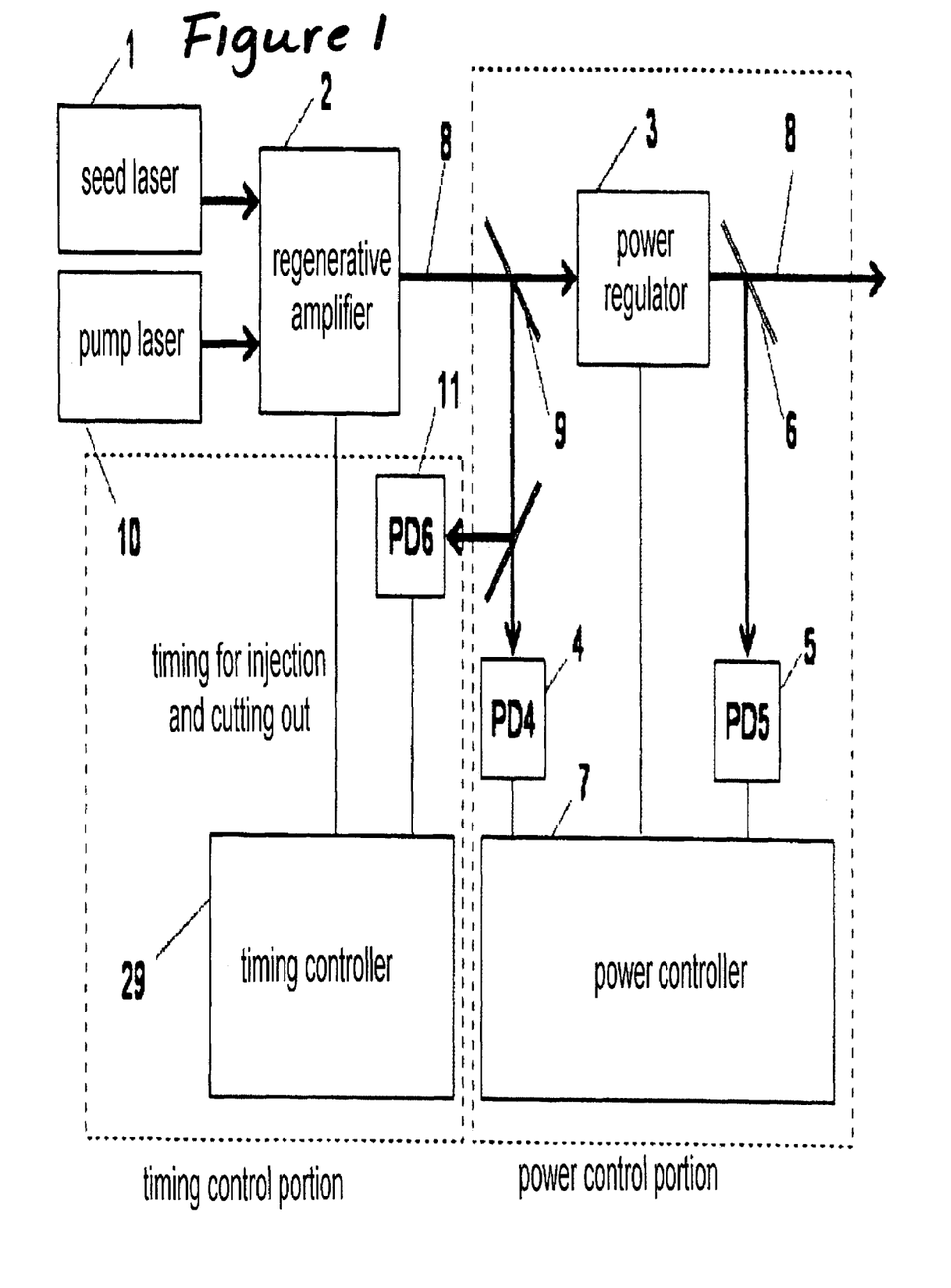
FIG. 1 is a block diagram of a femtosecond laser device.
Figure 4:
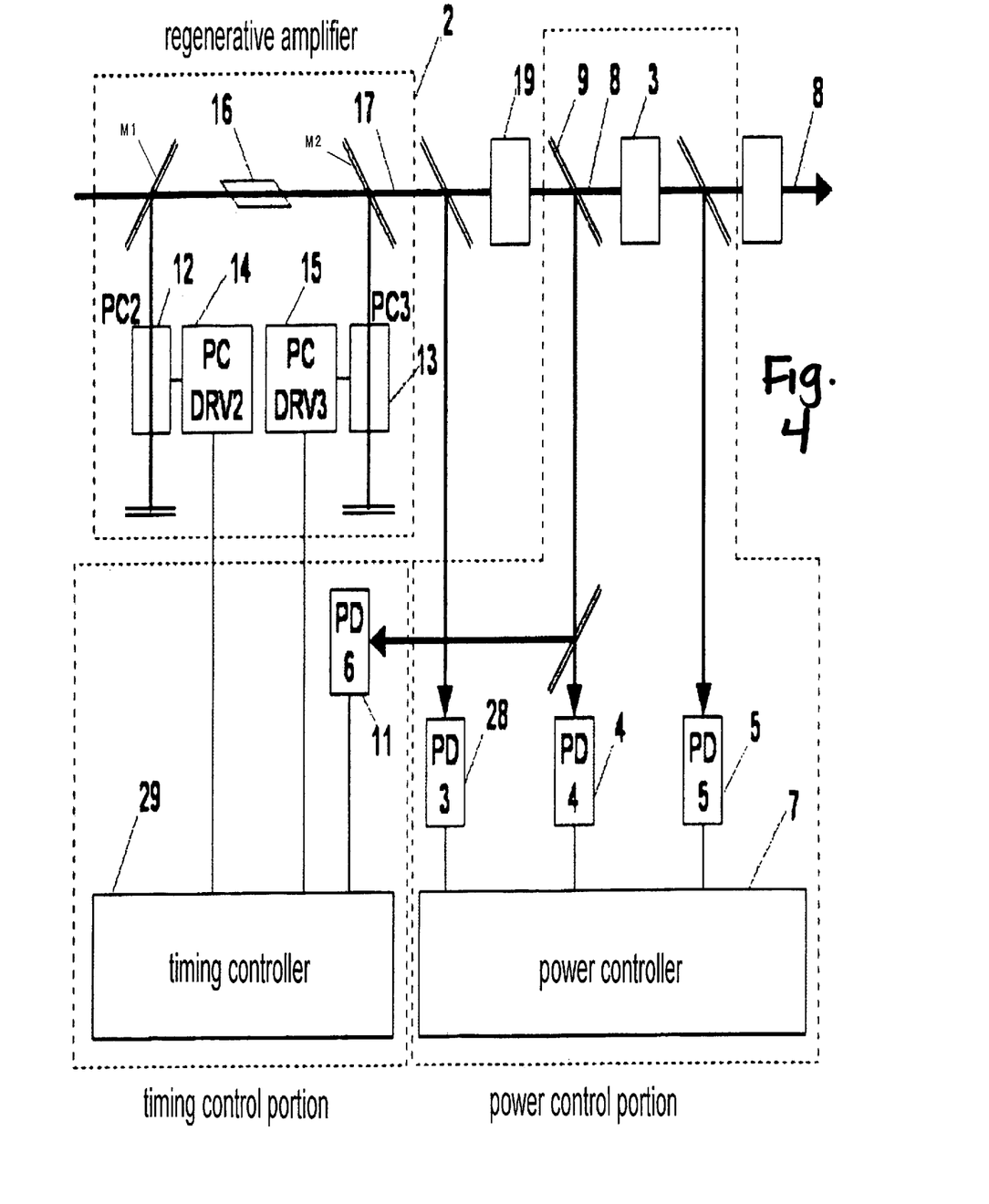
FIG. 4 is a schematic block diagram of a regenerative amplifier.
Figure 7:
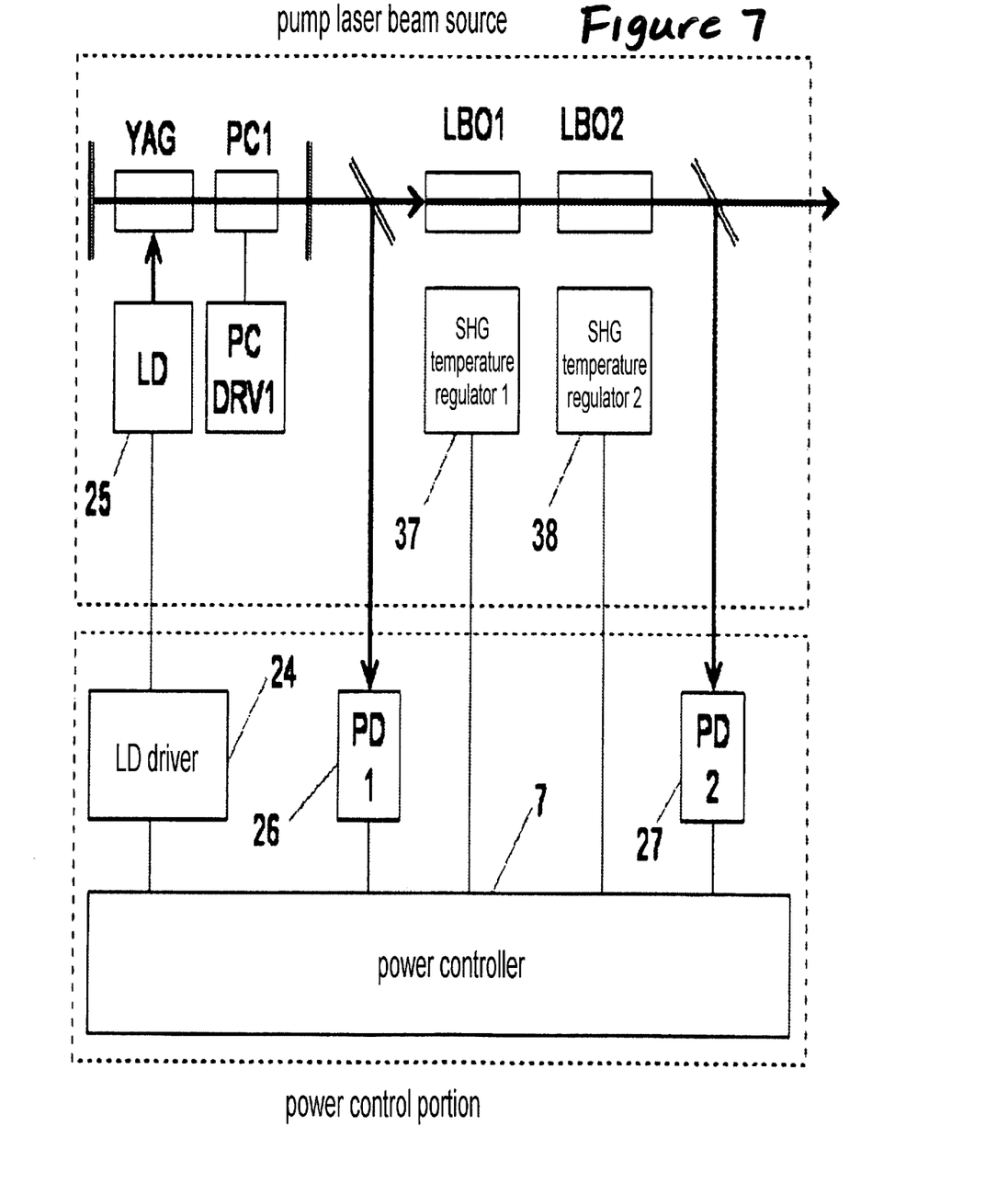
FIG. 7 is a block diagram of a pump laser beam source.

Next, a power control portion, timing control portion and regenerative amplifier constituting the femtosecond laser device of the present invention shall be described. The power control portion is a portion for controlling the power of the output beam, comprising first-fifth photodetectors PD1-PD5, an LD driver 24, power regulator 3 and a power controller 7 as shown in FIGS. 1, 4 and 7. The outputs of the first-fifth photodetectors are inputted to the power controller 7. The timing control portion comprises a timing controller and a sixth photodetector 11 (PD6) as shown in FIG. 4, the sixth photodetector 11 being connected to a timing controller. The regenerative amplifier comprises mirrors M1 and M2, a laser crystal 16 and two Pockels cells (PC2, PC3) as shown in FIG. 4.

EMBODIMENT 1

The first embodiment of the present invention is a device to stabilize the output of a regenerative amplifier by feed-forward control. FIG. 1 is a block diagram of a regenerative amplifier wherein, as should be known to those skilled in the art, a seed laser 1 and a pump laser 10 are inputted to a regenerative cavity 2 and the output beam 8 passes through a variable attenuator 3. This variable attenuator 3 shall henceforth be referred to as a power regulator 3. When the output beam 8 is outputted from the regenerative cavity 2, a portion is extracted by the first mirror 9 and made incident on the first photodetector 4. Then, the output beam 8 passes through the power regulator 3 and a portion is extracted by the second mirror 6, and made incident on the third photodetector 5 positioned behind the amplifier. The first photodetector 4 and the third photodetector 5 respectively transmit signals corresponding to the incident beams to the power controller 7. At the power controller 7, an appropriate control quantity is calculated from the received signal to control the power regulator 3. In FIG. 1, a portion of the beam extracted by the first mirror 9 is fed to a second photodetector 11 before entering the first photodetector 4, but, in this embodiment, the second photodetector 11 is not used, and the power regulator 3 is controlled using the signals from the first photodetector 4 and the third photodetector 5.

Next, a method for controlling the power regulator 3 shall be described with reference to FIG. 2. The horizontal axis of the graph represents the transmission rate of the power regulator and the vertical axis represents the optical intensity. Here, the optical intensity detected by the first photodetector 4 shall be referred to as PD4 and the optical intensity detected by the third photodetector shall be referred to as PD5. First, the loss of the power regulator 3 is measured beforehand. In other words, the optical attenuation rate when the transmission rate of the power regulator 3 is made 100%, i.e. the loss of the power regulator 3 itself, is measured and indicated as $\alpha$. As a result, when the transmission rate of the power regulator 3 is 100%, the relationship $PD5_{max}=\alpha \cdot PD4$ is established between PD4 and PD5. Here, $PD5_{max}$ represents the optical intensity as measured by the third photodetector when the transmission rate of the power regulator is 100%.

Figure 2:
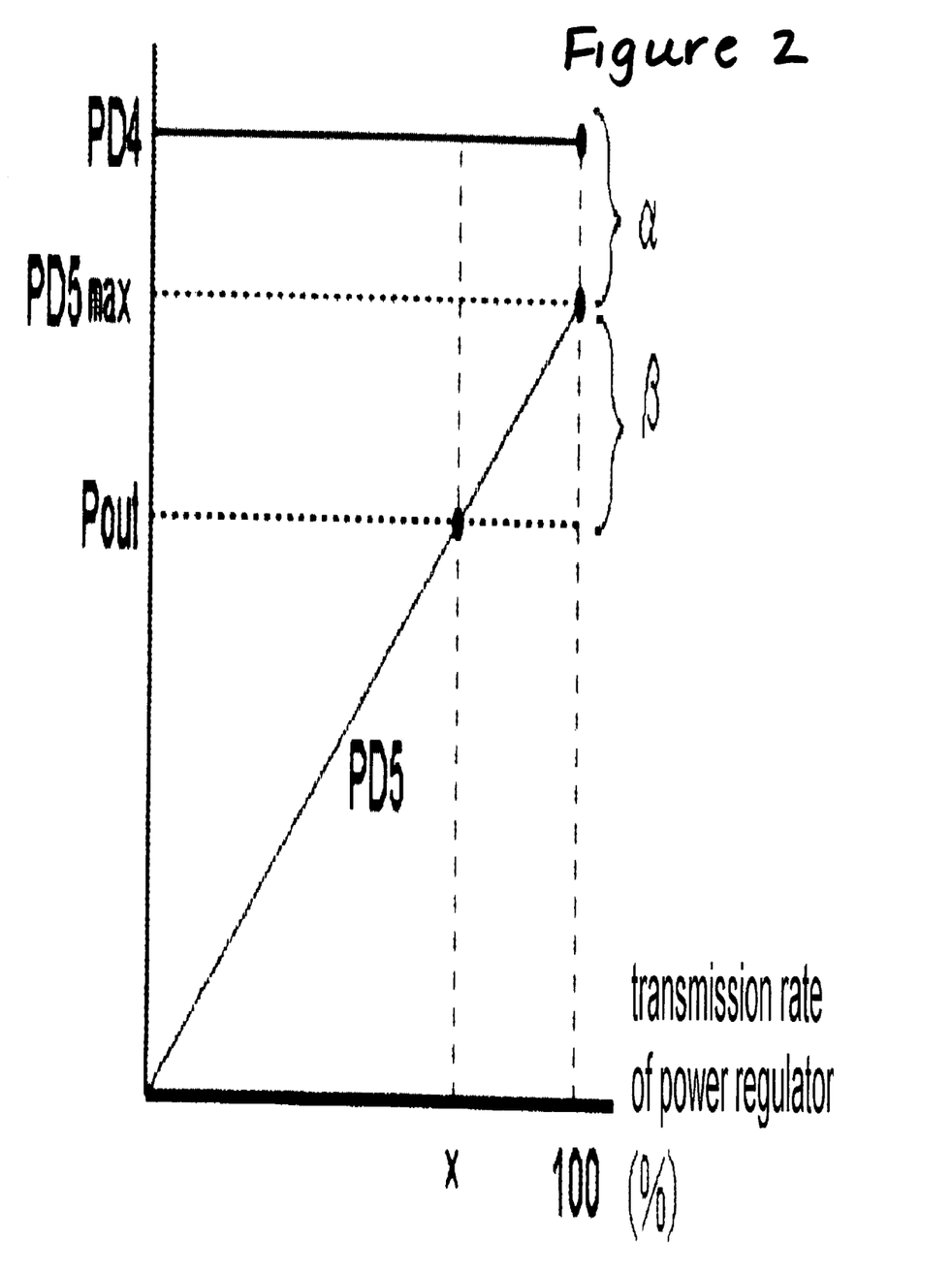
FIG. 2 is a graph showing the relationship between the transmission rate and optical intensity of a power regulator.

Next, when indicating the target output as $P_{out}$, the difference from $PD5_{max}$ is $\beta$ as shown in FIG. 2, and more strictly speaking, $\beta$ is the ratio of $P_{out}$ to $PD5_{max}$. Therefore, $P_{out}=\beta \cdot PD5_{max}=\alpha \cdot \beta \cdot PD4$. In other words, the targeted control quantity of the power regulator 3 can be calculated from the values of PD4, $\alpha$ and $\beta$, and this can be used to set the transmission rate $\chi$ of the power regulator 3.

There is the possibility that PD4 will be deviant from the time the calibration is performed, so that the output can be held continually stable as long as the laser is activated by repeating the above operation at regular intervals. Additionally, even in the event of stabilization to a tiny output, PD4 is close to the maximum output, so that the measurement system can hold the quantization error of the AD converter and the effects of thermal noise to a minimum.

EMBODIMENT 2

Figure 3:
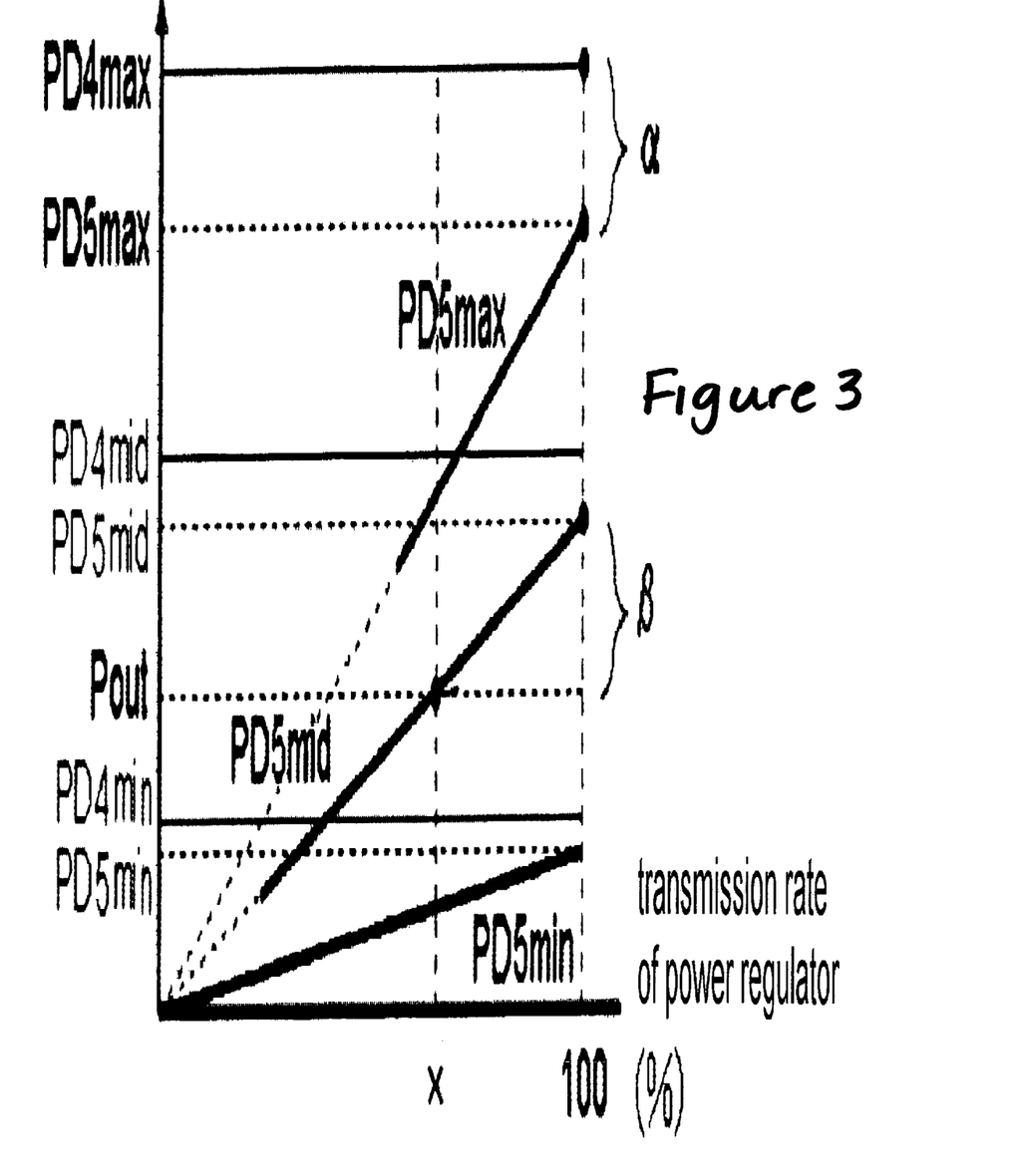
FIG. 3 is a graph showing the relationship between the transmission rate and optical intensity of a power regulator.

In the present embodiment, another method shall be described. As shown in FIG. 3, PD4 and PD5 are compared when the transmission rate of the power regulator 3 is set to 100% as shown in FIG. 3 to determine the loss $\alpha$ of the power regulator 3 itself. At this time, if the target output, i.e. $P_{out}$ is small, the power regulator will cause a large attenuation. Thus, if $P_{out}$ is small, the power regulator 3 can be used effectively by also making the output of the pump beam small. In this case, $\beta$ can be determined by the ratio between PD5 and $P_{out}$ in the range containing $P_{out}$. As a result, it is possible to determine $P_{out}=\alpha \cdot \beta \cdot PD4$, by which the transmission rate $\chi$ of the power regulator 3 can be set. While the ranges shown in FIG. 3 are the three labeled max, mid and min, the number of ranges need not be limited to three, and may be set as appropriate by those skilled in the art.

EMBODIMENT 3

In the present embodiment, a method of stabilizing the output by changing the timing for injecting and cutting out the femtosecond laser beam in a regenerative amplifier shall be described. FIG. 4 is a schematic block diagram of a regenerative amplifier, with a laser cavity 2 containing a laser crystal 16, Pockels cells 12, 13 and their drivers 14, 15. An amplified laser beam 17 passes through the compressor 19 and through the power regulator 3. This block diagram shows a typical femtosecond laser, and the compressor 19 is not essential to the present invention.

Figure 5:
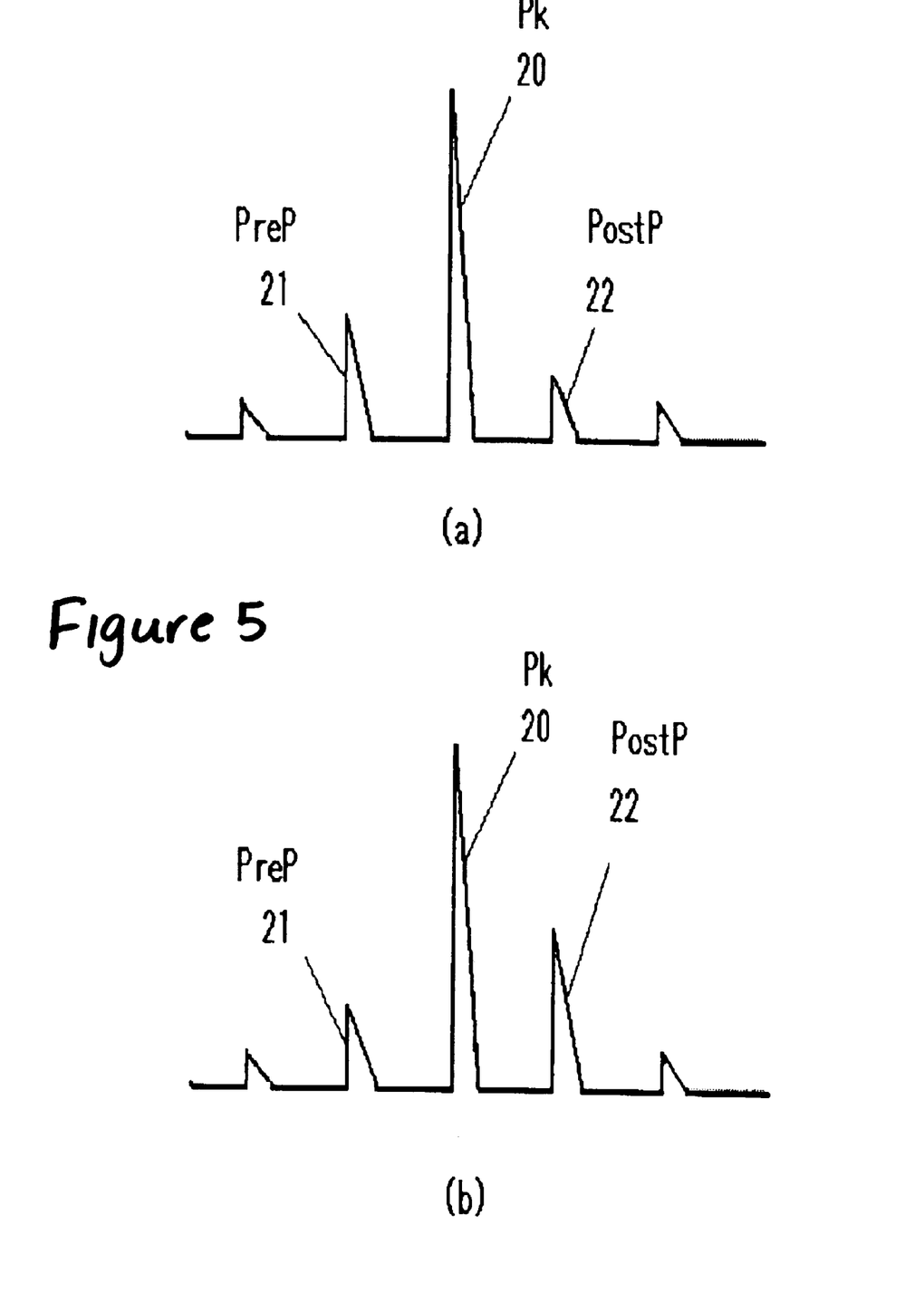

In a femtosecond laser device having such a structure, a portion of the output beam 8 is extracted by the mirror 9, and detected in the first photodetector 4 and the second photodetector 11. At this time, the optical intensity is measured in the photodetector 4 and the waveform is measured in the second photodetector 11. FIGS. 5(a) and (b) show the measured waveform. The peak with the highest intensity in the measured waveform is indicated as Pk 20, the previous peak as PreP 21 and the following peak by PostP 22. Here, when the sizes of the peaks are such that PreP 21>PostP 22 as shown in FIG. 5(a), the waveform cutout timing is delayed by one step. Additionally, when the sizes of the peaks are such that PreP 21<PostP 22 as shown in FIG. 5(b), the waveform cutout timing is advanced by one step. This kind of adjustment shall henceforth be referred to as a pre-post adjustment loop.

Figure 6:
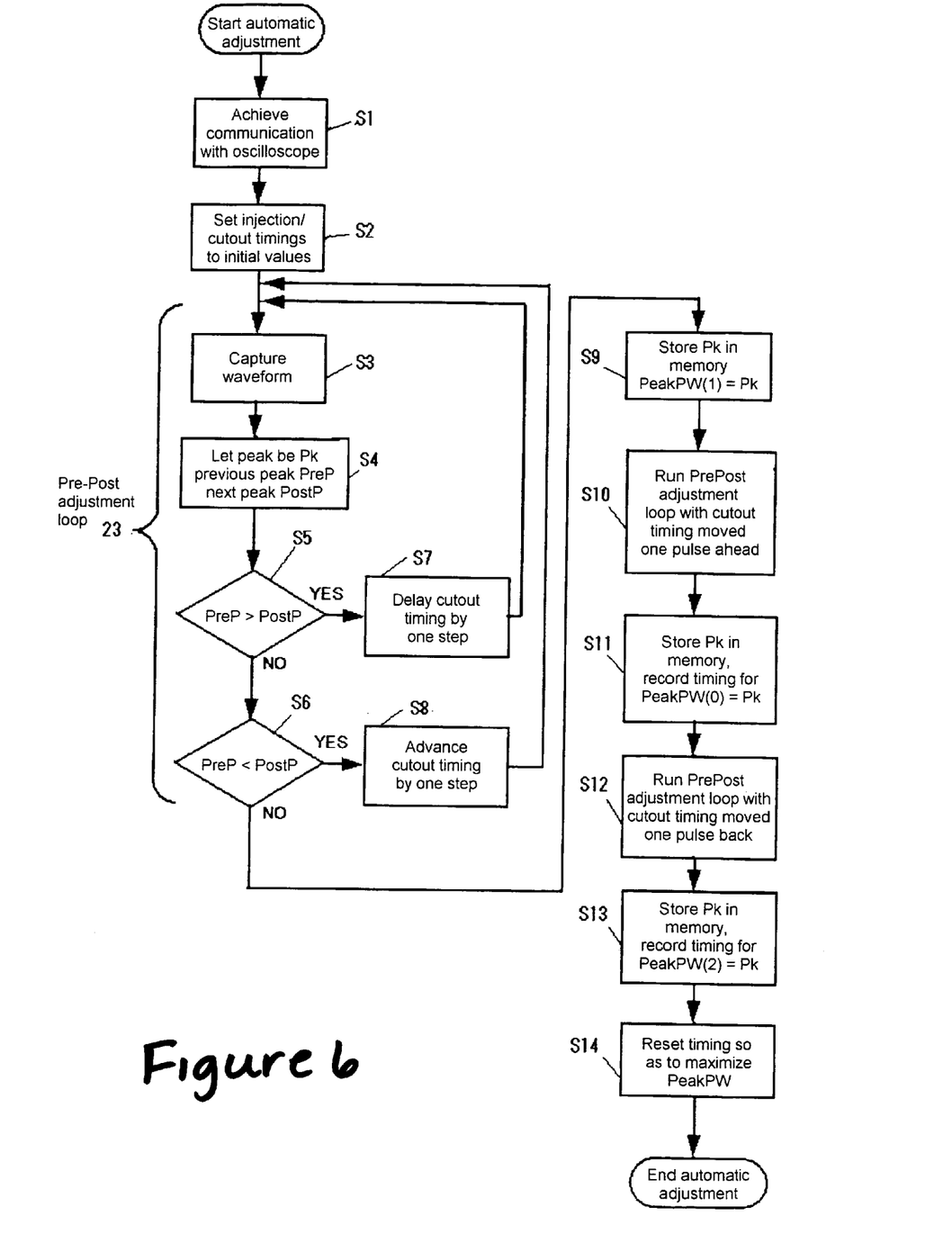
FIG. 6 is a flow chart for a timing adjustment procedure.

Next, adjustments are made to make Pk 20 the maximum pulse. The overall timing adjustment process is indicated by the flow chart in FIG. 6. The above pre-post adjustment loop 23 is performed by carrying out the steps from S3 to S8. Next, in step S9, Pk 20 is stored in memory and the timing is recorded. Further, in step S10, the cutout timing is shifted forward by one or more pulses, and the pre-post adjustment loop 23 is performed. Then, in step S11, the Pk 20 is again stored in memory and the timing recorded. In step S12, the pulse cutout timing is shifted backward by one or more pulses from the original value, and the pre-post adjustment loop 23 is performed. In step S13, the peak 20 is stored and the timing is recorded. Finally, in step S14, the pulse cutout timing is set to a timing such that the peak is maximized. In this way, the pulse cutout timing can be reset to maximize the peak and thereby stabilize the output. By following this flow, the pulse cutout timing in a femtosecond laser device can be adjusted so as to stabilize the output. Additionally, the timing can be automatically adjusted by executing these steps in a program.

EMBODIMENT 4

In the present embodiment, a method for maintaining the output in a stable state and further prolonging the lifetime of a laser device by adjusting the parameters of the laser device overall including the pump laser source and the seed laser source in a femtosecond laser device shall be described. The LD current, output of the regenerative amplifier, and injection and cutout timings of the femtosecond laser beam are essential elements in optimizing the parameters of a femtosecond laser device comprising a pump laser source, a seed laser source and a regenerative amplifier to stabilize the output and prolong the lifetime of the device. Output control of the regenerative amplifier can be performed by using the method described in Embodiment 1. Additionally, the injection and cutout timing of the femtosecond beam can be adjusted by using the method of Embodiment 3. Thus, the control of the LD current shall be described.

Figure 8:
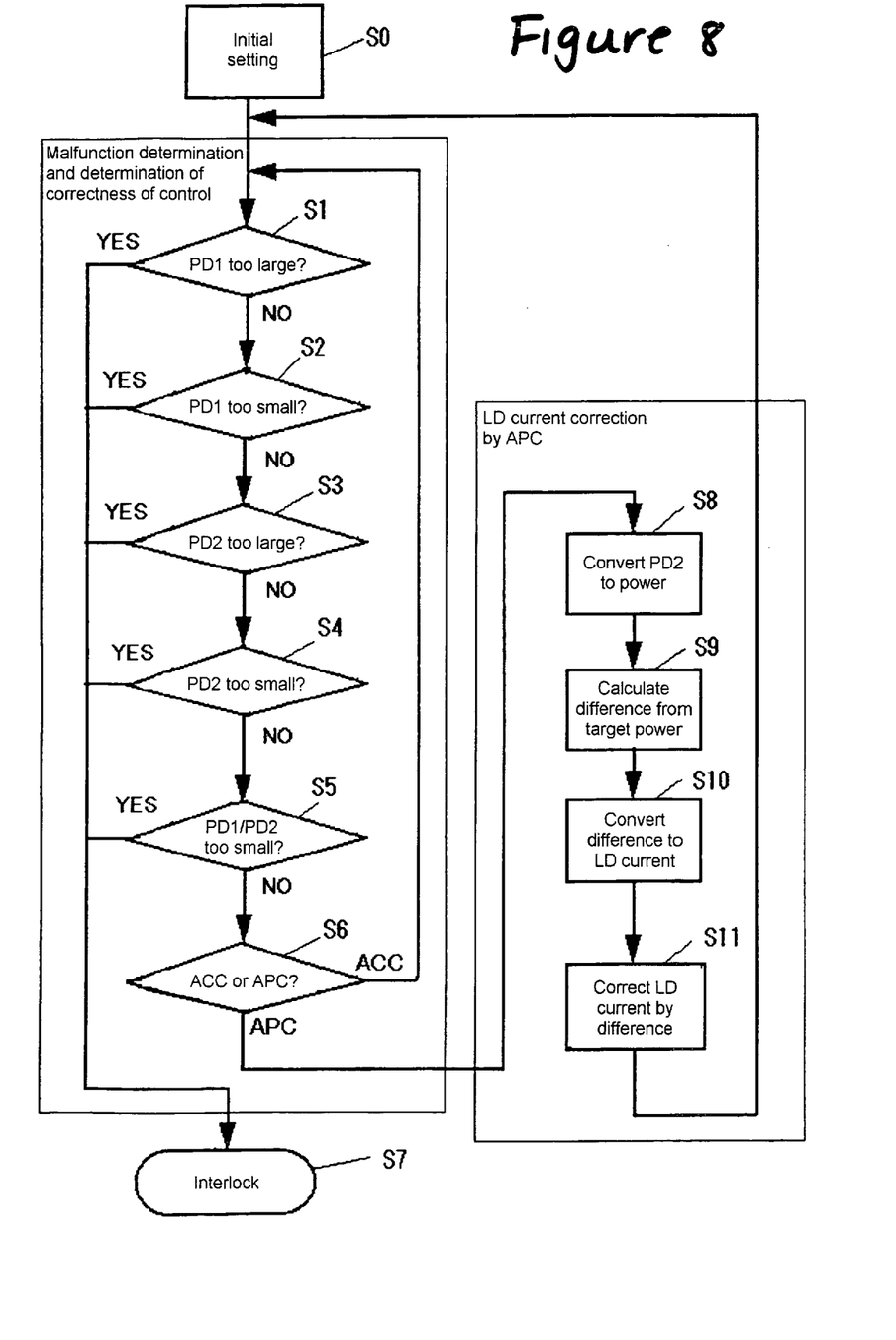
FIG. 8 is a flow chart for an LD current adjustment procedure.

FIG. 7 shows a block diagram of a pump laser. The LD (laser diode) 25 is driven by an LD driver 24. The LD driver 24 is controlled by a fourth photodetector 26 and a fifth photodetector 27. In the drawing, there are two SHG's, and temperature regulators are provided to regulate their temperatures. As shown in the drawing, these are respectively a first SHG temperature regulator 37 and a second SHG temperature regulator 38. In the present embodiment, the fourth photodetector 26 and the fifth photodetector 27 are used, but the temperature regulators 37, 38 are not used. FIG. 8 shows a control flow chart. As a first step, an initial setting S0 is performed. This initial setting is an operation for activating the pump laser, and is a known procedure among those skilled in the art. Next, we shall consider the steps of analyzing the optical intensities detected by the fourth photodetector 26 and the fifth photodetector 27. In FIG. 8, S1-S6 are steps for determining whether the light detected at the fourth and fifth photodetectors 26, 27 is greater than or smaller than a predetermined intensity. If the light detected by these two photodetectors lies outside a predetermined range of intensities, in other words if greater than or smaller than certain threshold values, then an interlock is activated as step S7. If within the predetermined range, the drive format advances to step S6 to determine whether ACC or APC. Here, if APC, the procedure advances to step S8, and if ACC, the procedure returns to step S1. If APC, the power of the detected light in the fifth photodetector is calculated in step S8. Next, in step S9, the difference between the calculated power and the target power is calculated. In step S10, the difference is converted to LD current in order to correct the difference calculated in step S9. In the final step S11, the LD current is corrected by the difference. This is performed in FIG. 7 by the controller 7 controlling the LD driver 24. The output of the pump laser is stabilized using this procedure. Here, either of the fourth photodetector and the fifth photodetector can be used for control. In this case, step S5 should be skipped.

By controlling the LD current and respectively optimizing the output of the regenerative amplifier, and the injection and cutout timing of the femtosecond laser beam, the output of the femtosecond laser can be stabilized, but the lifetime of the device can be prolonged and the output thereby stabilized by further optimizing other parameters. Such parameters include, for example, the reflective mirror of the pump beam source, the fundamental harmonic temperature, the SHG temperature, the Pockels cell voltage, the optical axis of the seed laser beam source, the optical intensity of the femtosecond laser beam, the temperature of the optical system of the regenerative amplifier, and the voltage of the Pockels cells.

Figure 9:
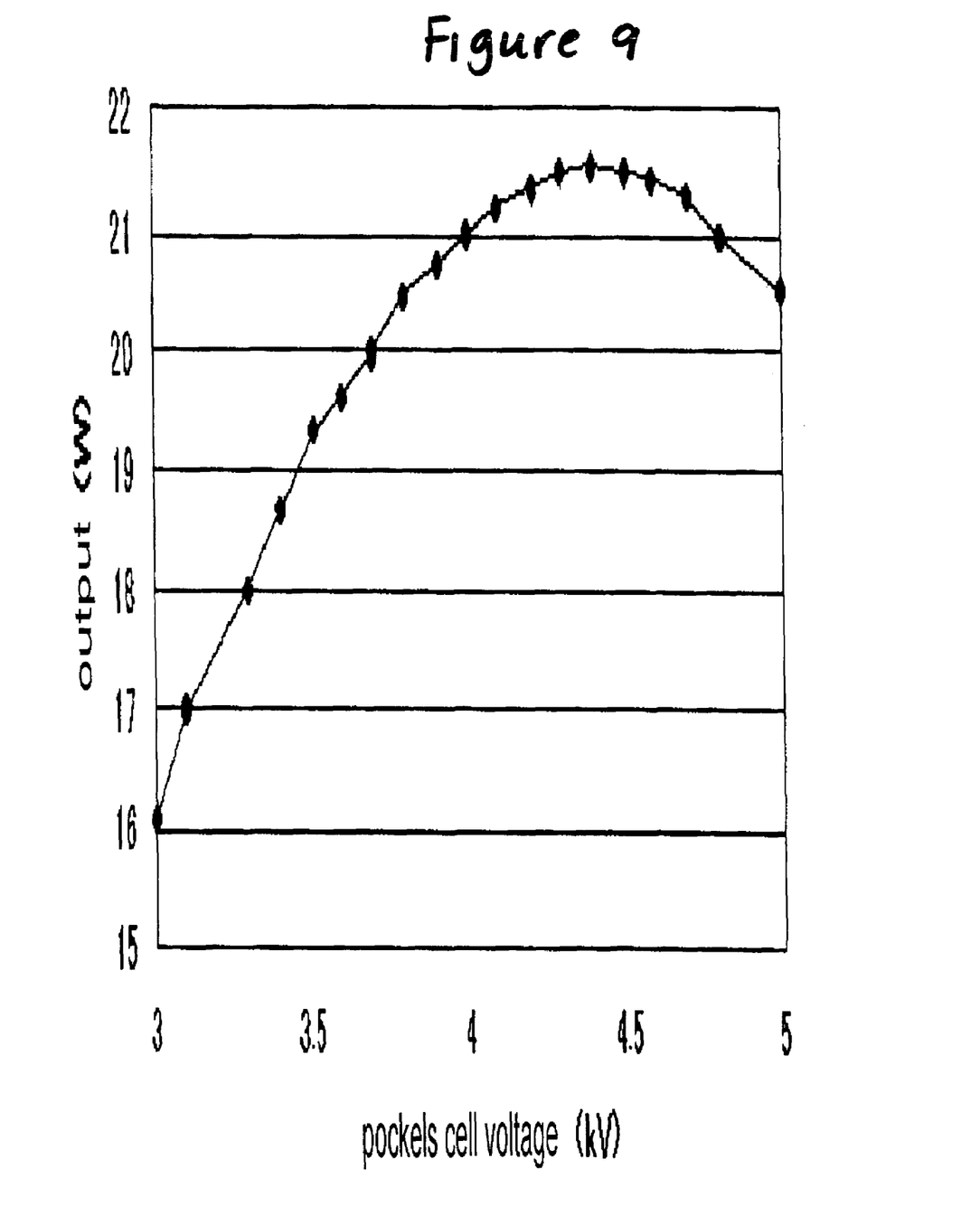
FIG. 9 is a graph showing the relationship between a Pockels cell voltage and pump beam output.

Here, an example of the relationship between the Pockels cell voltage and the pump beam output is shown in FIG. 9. From this graph, it can be seen that the pump beam output largely varies in the range of Pockels cell voltages of 3-4.5 kV. Thus, it can be seen that stabilization of the Pockels cell voltage will contribute to stabilization of output.

EMBODIMENT 5

Figure 10A:
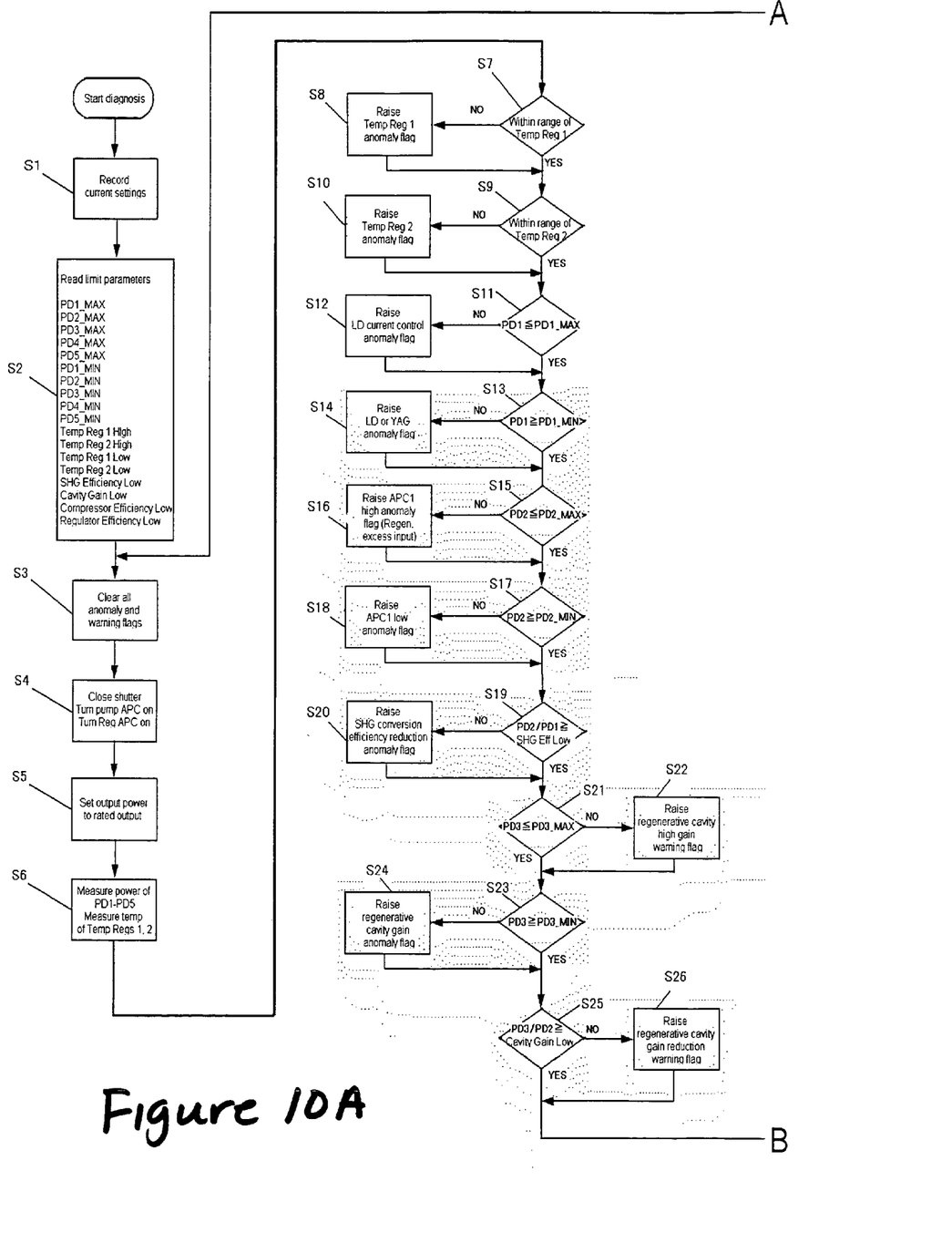
FIGS. 10A and 10B is a flow chart for a malfunction diagnosis procedure.
Figure 10B:
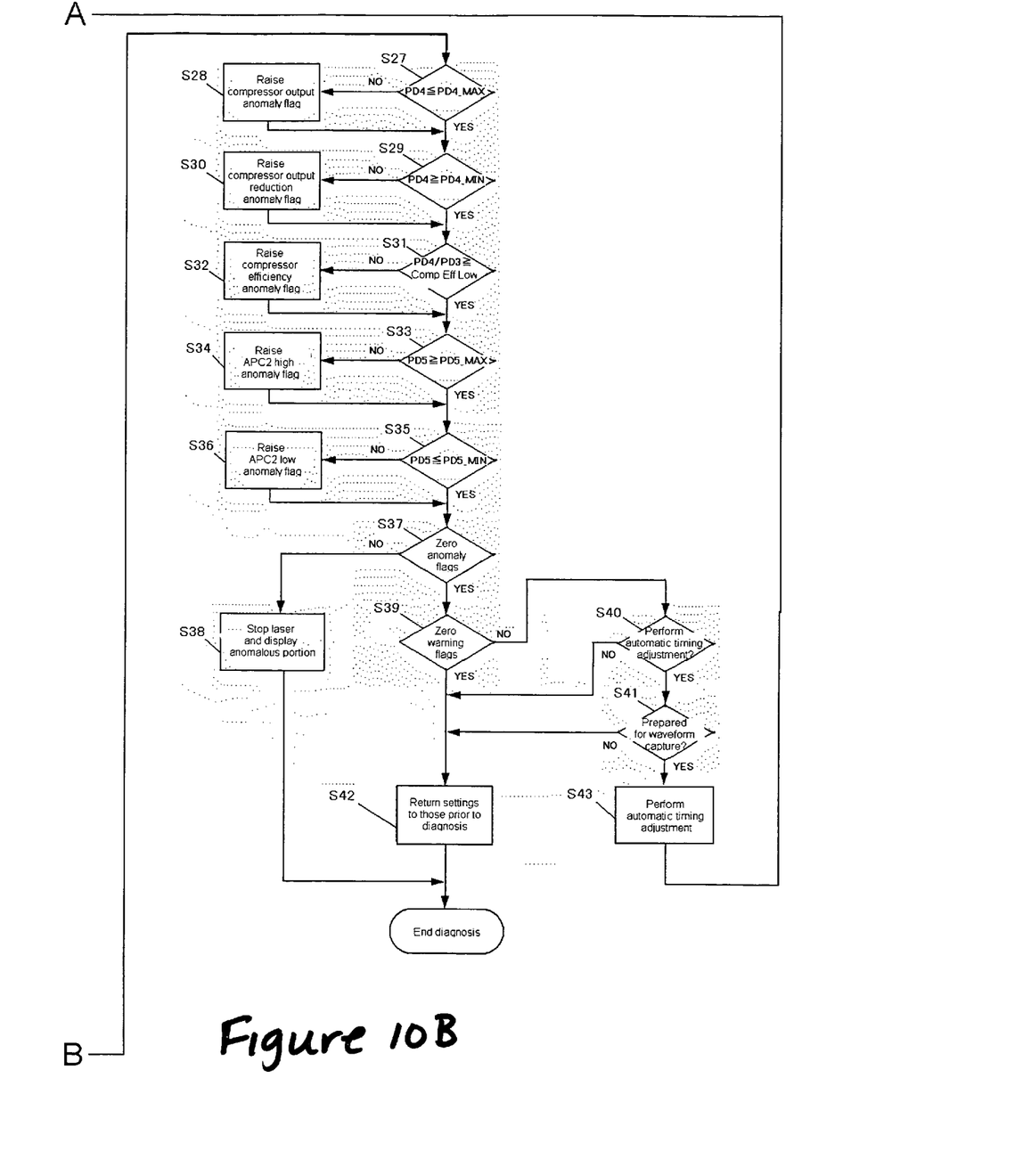

Finally, a method of diagnosing a malfunction by applying these embodiments shall be described. FIG. 10 is a flow chart showing the entire procedure for malfunction diagnosis. First, in step S1, the current settings of the device are recorded. Next, the respective parameters are read. Further, in step S3, respective anomaly flags and warning flags are cleared, and in step S4, the automatic power adjustment of the pump beam source and the regenerative amplifier are turned on. This completes the preparation for performing malfunction diagnosis, and in the subsequent steps, malfunction diagnosis is performed.

In step S7, it is determined if the temperature of a first SHG is within a predetermined range. This is performed using the first SHG temperature regulator 37 shown in FIG. 7. If within the predetermined range, the procedure proceeds to the next step, and if outside the range, the procedure proceeds to step S8 where an anomaly flag is raised. After the anomaly flag is raised in step S8, the procedure advances to step S9. In step S9, a second SHG temperature regulator 38 is used to perform a similar procedure with respect to the second SHG. In the next step S11, the optical intensity detected in the fourth photodetector 26 and the maximum optical intensity of the photodetector are compared. If the intensity at the fourth photodetector 26 exceeds the maximum value, there is an anomaly in the LD current control, so the procedure advances to step S12, where an LD current control anomaly flag is raised. Then, the procedure advances to step S13. If there are not anomalies, the procedure advances directly to the next step S13. In step S13, the optical intensity detected by the fourth photodetector 26 is compared to the minimum value of the optical intensity. If smaller than the minimum value, then the optical intensity is extremely weak, so either there is an anomaly in the LD current control, or the output of the YAG laser is small as shown in FIG. 7. Thus, in this case, the procedure advances to step S14, where the LD or YAG anomaly flag is raised, and the procedure advances to the next step S15. In steps S15 to S20, a similar procedure is performed with respect to the fifth photodetector 27. With these procedures, the steps when an anomaly is found to exist, S16, S18 and S20, indicate that there is an anomaly in the control of the pump beam source, i.e. APC1. Additionally, it indicates that there is an anomaly in the conversion efficiency of the SHG.

In the next step S21, similar procedures are performed with respect to the sixth photodetector 28 (see FIG. 4). If the output of this photodetector is great, then the procedure advances to step S22, and a flag is raised to indicate that the gain of the regenerative amplifier is excessive. In the next step S23, the optical intensity detected by the sixth photodetector 28 is compared to the minimum value, and if smaller than the minimum value, the procedure advances to step S24. In this step S24, a flag is raised to indicate that the gain of the regenerative amplifier is anomalous. Next, in step S25, the intensity of the light detected in the sixth photodetector 28 divided by the intensity of the light detected in the fifth photodetector is compared. In other words, (output of sixth photodetector)/(output of fifth photodetector) is calculated. If this is smaller than the lower limit of cavity gain, then there is a decrease in the gain of the cavity of the regenerative amplifier, and a flag is raised to indicate this.

Next, in step S27, the optical intensity of the first photodetector and the maximum value of this photodetector are compared. If the optical intensity is greater than the maximum value, the procedure advances to step S28, where a compressor output anomaly flag is raised, and the procedure advances to step S29. In step S29, the optical intensity detected by the photodetector is compared with the minimum value of the photodetector. If the optical intensity of the photodetector is smaller than the minimum value, the procedure advances to step S20, where the compressor output anomaly flag is raised, and the procedure then advances to step S31. At step S31, the efficiency of the compressor is determined. This is obtained by the ratio of the optical intensity of the first photodetector to the optical intensity detected by the sixth photodetector. In other words, (output of first photodetector)/(output of sixth photodetector) is performed. If the result is less than the efficiency of the compressor, the procedure advances to step S32, and a flag is raised to indicate a decrease in compressor efficiency.

Next, in step S33, the optical intensity detected in the third photodetector and the maximum value of the photodetector are compared. If the optical intensity detected by this photodetector is greater than the maximum value, the procedure advances to step S34, and the output of the regenerative amplifier, i.e. APC 2, is too large, and a flag is raised to indicate this. In the next step S35, the optical intensity detected by the third photodetector and the minimum value of the photodetector are likewise compared. If the optical intensity detected by the photodetector is smaller than the minimum value, then the procedure advances to step S36, and a flag is raised to indicate that the output of the regenerative amplifier is too small.

If there are not anomaly flags after considering each of the parameters in this way, the procedure advances to step S39. If there is an anomaly flag, the procedure advances to step S38, where the laser is stopped and the anomalous portion displayed. This completes the diagnosis. Upon advancing to step S39, it is determined whether there are any warning flags. If there are no warning flags, the procedure advances to step S42, and returns to the settings prior to the start of the diagnosis. If there is a warning flag, the procedure advances to step S40 where a user is asked whether or not an automatic timing adjustment should be performed. Alternatively, the timing adjustment may be performed automatically. If the timing adjustment is to be performed, the procedure advances to step S41, where it is determined if the device is prepared to capture waveforms. If not prepared, the procedure advances to step S42. If prepared, the procedure advances to step S43 where an automatic timing adjustment is performed. Then, the procedure returns to step S3 to perform the diagnosis again.

By following the above flow, it is possible to automatically optimize the femtosecond laser device. As a result, the lifetime of the laser device can be prolonged, thereby also prolonging the duration over which the output is stable.

In the present invention, it is also possible to stabilized the output by adjusting the optical axis of the reflective mirror of the pump beam source or by increasing the mechanical strength of coupling if a seed beam source, pump beam source and regenerative amplifier are to be coupled.

The invention claimed is:

1. A femtosecond laser device with stabilized output comprising a regenerative amplifier, a first photodetector, a power controller and a variable attenuator, wherein the variable attenuator is provided so as to be capable of controlling an output beam of the regenerative amplifier, said first photodetector detects the output beam of said regenerative amplifier which is also an input beam of said variable attenuator and transmits first results of the detection to said power controller, and said power controller controls said variable attenuator depending on a difference between a predetermined target value and said first results.

2. A device in accordance with claim 1, wherein the device further comprises a second photodetector and said second photodetector detects an output beam of said variable attenuator and transmits second results of the detection to said power controller, and said power controller further controls said variable attenuator depending on a difference between a predetermined target value and said second results.

3. A femtosecond laser device with stabilized output comprising a regenerative amplifier, a first photodetector, a second photodetector, a power controller and a timing controller, wherein a portion of an output beam from a laser cavity in the regenerative amplifier is reflected by a mirror for extracting said portion, and a part of said portion is incident on said first photodetector and another part of said portion is incident on said second photodetector, said first photodetector detects an intensity of the output beam from said laser cavity and transmits results of the intensity detection to said power controller, said second photodetector detects a waveform of the output beam from said laser cavity and transmits results of the waveform detection to said timing controller, and said timing controller sets a cutout timing of a laser pulse from the results of detection by said first and second photodetectors so as to output a maximum laser pulse from said laser cavity in said regenerative amplifier.

4. A device in accordance with claim 3, wherein the timing controller, to set the cutout timing, :
   (1) captures a waveform, sequentially obtaining a first, second and third peak, the peak before the second peak being the first peak and the peak following the second peak being the third peak, said peaks including respective sizes;
   (2) delays the cutout timing if the sizes of the peaks are such that (first peak)>(third peak);

(3) advances the cutout timing if the sizes of the peaks are such that (first peak)<(third peak); and
(4) if neither (2) or (3) apply, stores the second peak in memory and records the timing.

5. A device in accordance with claim 4, wherein the timing controller, to set the cutout timing, repeats actions (1)-(4) after shifting the cutout timing forward by a plurality of pulses from an initial value.

6. A device in accordance with claim 4, wherein the timing controller, to set the cutout timing, repeats actions (1)-(4) after shifting the cutout timing backward by a plurality of pulses from an initial value.

7. A laser device with stabilized output in accordance with any one of claims 4-6, comprising a third photodetector for detecting an output beam intensity prior to wavelength conversion of a pump beam source that feeds light to the regenerative amplifier, and a fourth photodetector for detecting the output beam intensity of the pump beam source, wherein a difference between a target value and an optical intensity detected by at least one of the photodetectors among said third and fourth photodetectors is calculated, and this difference is converted to a laser diode current, wherein the pump beam source includes a laser diode.

8. A method of stabilizing an output of a femtosecond laser device comprising a regenerative amplifier, and a variable attenuator that controls an intensity of an output beam of said regenerative amplifier by attenuating the output beam, comprising steps of detecting the intensity of the output beam of the regenerative amplifier, the output beam of the regenerative amplifier being also an input beam of the variable attenuator, and setting an attenuation rate of said variable attenuator from a loss of the variable attenuator and the detected intensity so as to obtain a target output beam intensity.

9. A method for stabilizing an output of a femtosecond laser device comprising a regenerative amplifier, a first photodetector, a second photodetector and a control portion, comprising steps of detecting an intensity of an output beam that is outputted from a laser cavity in the regenerative amplifier with said first photodetector, detecting a waveform of the output beam with the second photodetector, transmitting results of these detections to said control portion, and setting a cutout timing of a laser pulse so as to output a maximum laser pulse from the laser cavity in said regenerative amplifier by a predetermined method from the results of the detection by said first and second photodetectors.

10. A method in accordance with claim 9, wherein a timing control portion sets the cutout timing by performing, at least once, the steps of:
(1) capturing a waveform, sequentially obtaining a first, second and third peak, the peak before the second peak being the first peak and the peak following the second peak being the third peak, said peaks including respective sizes;
(2) delaying the cutout timing if the sizes of the peaks are such that (first peak)>(third peak);
(3) advancing the cutout timing if the sizes of the peaks are such that (first peak)<(third peak); and
(4) if neither (2) or (3) apply, storing the second peak in memory and recording the timing.

11. A method in accordance with claim 10, wherein the timing control portion sets the cutout timing by performing the following step:
(5) repeating steps (1)-(4) after shifting the cutout timing forward by a plurality of pulses from an initial value.

12. A method in accordance with claim 10, wherein the timing control portion sets the cutout timing by performing the following step:
(5) repeating steps (1)-(4) after shifting the cutout timing backward by a plurality of pulses from an initial value.

13. A method for stabilizing output in accordance with any one of claims 8-11, wherein the femtosecond laser device further includes a photodetector for detecting an output beam intensity prior to wavelength conversion of a pump beam source that feeds light, to the regenerative amplifier, and a photodetector for detecting the output beam intensity of the pump beam source, said method further comprising a step of calculating a difference between a target value and an optical intensity detected by at least one of the photodetector for detecting the output beam intensity prior to wavelength conversion of the pump beam source that feeds light to the regenerative amplifier, and the photodetector for detecting the output beam intensity of the pump beam source, and this difference is converted to a laser diode current, wherein the pump beam source includes a laser diode.

* * * * *